(12) United States Patent
Cheikh

(10) Patent No.: US 8,929,814 B2
(45) Date of Patent: Jan. 6, 2015

(54) DETECTION AND NEAR-FIELD COMMUNICATION DEVICE

(71) Applicants: Continental Automotive France, Toulouse (FR); Continental Automotive GmbH, Hannover (DE)

(72) Inventor: Mohamed Cheikh, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 129 days.

(21) Appl. No.: 13/798,466

(22) Filed: Mar. 13, 2013

(65) Prior Publication Data

US 2013/0244577 A1 Sep. 19, 2013

(30) Foreign Application Priority Data

Mar. 14, 2012 (FR) ...................................... 12 52277

(51) Int. Cl.
| | |
|---|---|
| *H04B 5/00* | (2006.01) |
| *G07C 9/00* | (2006.01) |
| *G06K 7/10* | (2006.01) |
| *H01Q 1/32* | (2006.01) |
| *H01Q 7/00* | (2006.01) |
| *H01Q 19/00* | (2006.01) |
| *H01Q 1/38* | (2006.01) |
| *H01Q 21/29* | (2006.01) |

(52) U.S. Cl.
CPC ........ *G07C 9/00309* (2013.01); *G06K 7/10128* (2013.01); *G06K 7/10178* (2013.01); *G06K 7/10237* (2013.01); *H01Q 1/3241* (2013.01); *H01Q 1/3283* (2013.01); *H01Q 7/00* (2013.01); *H01Q 19/00* (2013.01); *H01Q 1/38* (2013.01); *H01Q 21/29* (2013.01)
USPC ....................................................... 455/41.1

(58) Field of Classification Search
CPC .......... G06K 7/10128; G06K 7/10178; G06K 7/10237; G07C 9/00309; H01Q 1/3241; H01Q 1/3283

USPC ......................................................... 455/41.1
See application file for complete search history.

(56) References Cited

U.S. PATENT DOCUMENTS

| | | | | |
|---|---|---|---|---|
| 6,963,305 B2 * | 11/2005 | Knapp | ........................ | 342/367 |
| 2004/0130442 A1 * | 7/2004 | Breed et al. | .................. | 340/443 |

(Continued)

FOREIGN PATENT DOCUMENTS

FR 2 920 916 3/2009

OTHER PUBLICATIONS

French Search Report dated Nov. 23, 2012, corresponding to the Foreign Priority Application No. 1252277.

*Primary Examiner* — David Bilodeau
(74) *Attorney, Agent, or Firm* — Young & Thompson

(57) ABSTRACT

A detection and near-field communication device for detecting the approach of a portable device integrating a near-field communication antenna for communicating with the portable device, includes:
- a printed circuit including: an upper face oriented toward the portable device and a lower face, a microcontroller, a near-field reader, a detection module, a near-field communication antenna, situated on a face of the printed circuit having a first surface and being linked to the near-field reader;
- a plurality of resonators made of copper wire windings, printed on a face of the printed circuit, covering a surface substantially identical to the first surface;
- the resonators including frequency adjustment elements so as to resonate at the near-field communication frequency; and
- the resonators generating a voltage variation across their terminals and being connected to the detection module to detect the approach of the portable device.

12 Claims, 4 Drawing Sheets

(56) References Cited

U.S. PATENT DOCUMENTS

| | | | |
|---|---|---|---|
| 2005/0192727 A1* | 9/2005 | Shostak et al. | 701/37 |
| 2007/0146138 A1 | 6/2007 | Phipps et al. | |
| 2010/0001839 A1 | 1/2010 | Uchiyama et al. | |
| 2010/0117454 A1* | 5/2010 | Cook et al. | 307/104 |
| 2011/0035604 A1* | 2/2011 | Habraken | 713/193 |
| 2012/0249396 A1 | 10/2012 | Parsche | |

* cited by examiner

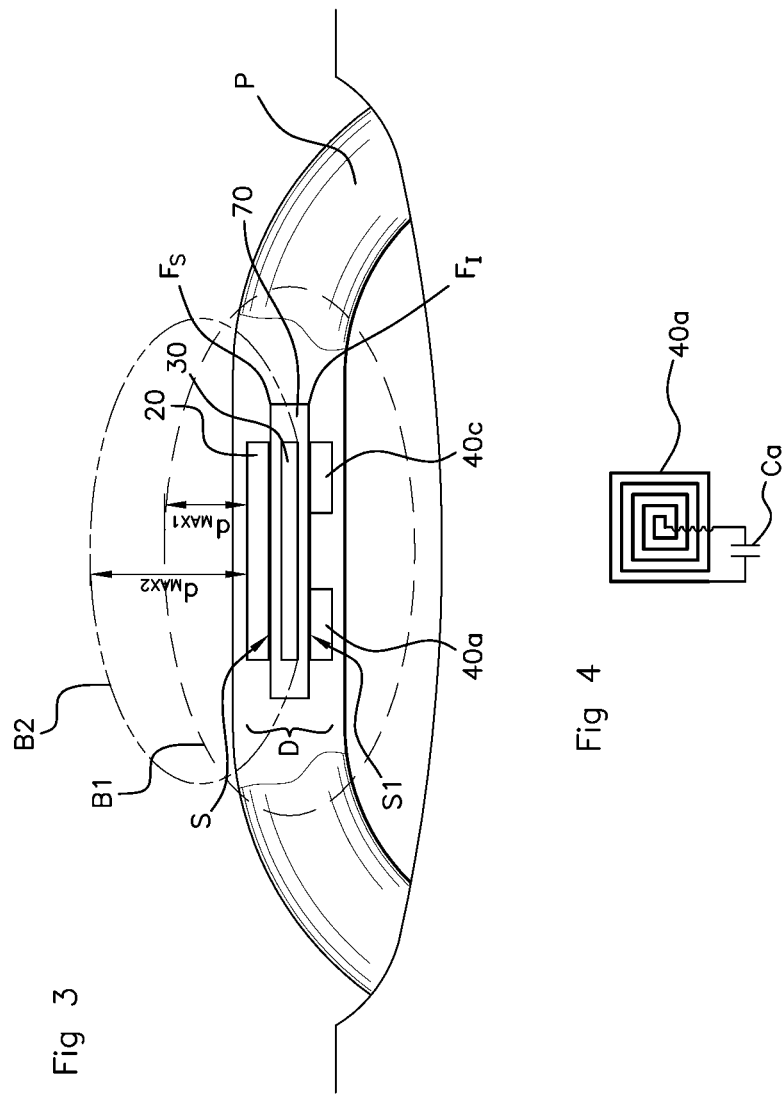

DETECTION AND NEAR-FIELD COMMUNICATION DEVICE

FIELD OF THE INVENTION

The invention relates to a detection and near-field communication device. More particularly, the invention relates to a detection antenna, onboard an automotive vehicle, for a "hands free" system for access to said vehicle and for near-field communication with this system. This detection and near-field communication antenna, also called an NFC ("Near Field Communication") antenna, detects the approach of a portable device (of the badge or portable telephone type) carried by a user, and communicates with this portable device in order to identify it. If the user is recognized as being a user authorized to access the vehicle, then the vehicle undertakes the unlocking of its doors. More precisely, the recognition of the portable device is carried out by a near-field communication reader, called an NFC reader, linked to the NFC antenna and integrated into a microcontroller. And the unlocking of the doors is triggered by an electronic unit onboard the vehicle, of the BCM ("Body Control Module", or chassis control module) type, connected to the microcontroller.

BACKGROUND OF THE INVENTION

According to the prior art, such an NFC antenna onboard a vehicle is situated in a door handle of the vehicle and is made of two parts: a detection antenna and a communication antenna. The detection antenna consists of copper wire windings wound around the communication antenna. The detection antenna is linked to a microcontroller, generally situated in proximity to the detection antenna, and integrated into the door handle of the vehicle. The variation of the voltage across the terminals of this detection antenna, measured by the microcontroller, allows the detection of the approach of a portable device. The detection antenna is generally of large size and larger than the communication antenna so as to obtain a larger detection range.

The communication antenna is composed of copper wire windings and can comprise in addition some components such as an adaptation capacitor. The communication antenna is linked to an NFC reader integrated into the microcontroller. This communication antenna communicates with an NFC antenna situated in the portable device, at the near-field communication frequency, i.e. at a frequency of 13.56 MHz. It is said that the communication antenna resonates at 13.56 MHz. The adjustment of the frequency of the communication antenna is carried out, for example, by virtue of the adaptation capacitor. In order to avoid any phenomenon of coupling between the detection antenna and the communication antenna, due inter alia to the large size of the detection antenna, the latter does not resonate at the frequency of 13.56 MHz. The detection antenna therefore detects the approach of any portable device and not only the approach of portable devices equipped with an NFC antenna communicating at 13.56 MHz. It is understood that this creates false detections, since the detection antenna detects any type of portable device and not solely the portable devices with which the communication antenna can communicate. This results in an attempt of communication between the communication antenna and the portable device which will fail and which consumes energy.

The main criterion of the performance of an NFC antenna, onboard a vehicle, is the communication distance between this antenna, which will be called the primary NFC antenna, and the NFC antenna situated in the portable device, which will be called the secondary NFC antenna. Indeed, the range of the near-field communication (that is to say at a frequency of 13.56 MHz) goes from 0 cm (the two objects communicating with one another are then in contact) up to a maximum of 10 cm. It is understood that there is an advantage in being able to communicate with the portable device at the maximum distance allowed by an NFC communication, there then being no need for the user to make the portable device approach the door handle, still less to place it in contact with the door handle of the vehicle, to establish the communication.

The NFC communication distance is directly related to the size of the communication antenna and to the power of this communication antenna, provided by the microcontroller. Now, the power provided by the microcontroller to the communication antenna impacts directly on the electrical consumption of the vehicle. And during the vehicle stop phases, this electrical consumption must be minimized, so as not to discharge the battery. Any power increase in order to increase the communication distance of the communication antenna has to be avoided.

The size of the communication antenna is also limited, since this communication antenna, the detection antenna and the associated electronics (microcontroller, NFC reader, etc.), that is to say the detection and near-field communication device, is generally integrated into a very restricted space of the door handle of the vehicle. The integration of the two parts of the primary NFC antenna, that is to say of the detection antenna and of the communication antenna, is often difficult because of the lack of room in the allocated space of a vehicle door handle.

Thus, it is not possible either to increase the size of the communication antenna or to amplify the power provided to this antenna, in order to raise the distance of communication with the secondary NFC antenna of the portable device.

It is known from the prior art, to place a ferrite beneath the primary NFC antenna, said ferrite being situated vehicle side. This ferrite reflects that part of the electromagnetic field of the communication antenna which is directed toward the vehicle. The consequence of the reflection of the electromagnetic field toward the exterior of the vehicle is to substantially increase the communication distance of the communication antenna. However, the addition of a ferrite is of a non-negligible cost and is not always achievable in the door handle's restricted space dedicated to the detection and near-field communication device.'

SUMMARY OF THE INVENTION

The invention therefore proposes a detection and near-field communication device making it possible to alleviate these drawbacks.

In this instance, the aim of the invention is a detection and near-field communication device comprising a primary NFC antenna, for detecting a portable device and for near-field communication with said portable device making it possible:
  to increase the near-field communication distance without impacting either the size of the primary NFC antenna or its power,
  to dispense with the detection antenna,
  detect solely the portable devices integrating an NFC antenna and not just any type of portable devices, thus reducing the number of false detections.

The invention proposes a detection and near-field communication device for detecting the approach of a portable device integrating a near-field communication antenna for communicating with said portable device, the detection and near-field communication device comprising:
a printed circuit, comprising:
an upper face, oriented toward the portable device and a lower face oriented on the opposite side from the upper face,
a microcontroller,
a near-field reader, and
a detection module,
a near-field communication antenna, situated on a face of the printed circuit having a surface and a center, and being linked to the near-field reader, said detection and near-field communication device furthermore comprising:
a plurality of resonators made of copper wire windings, printed on a face of the printed circuit, covering a surface substantially identical to the surface of the communication antenna,
said resonators comprising frequency adjustment means so as to resonate at the near-field communication frequency,
and said resonators generating a voltage variation across their terminal and being connected to the detection module to detect the approach of the portable device.

In a preferential manner, the communication antenna is situated on the upper face of the printed circuit which is oriented toward the portable device and the plurality of resonators is situated on the lower face of the printed circuit.

In a first embodiment, the frequency adjustment means comprise an adaptation capacitor.

In a second embodiment, the frequency adjustment means consist of a number of copper wire windings.

Preferably, the plurality of resonators is distributed in a homogeneous manner over the surface of the communication antenna. And more precisely, the plurality of resonators is distributed in a symmetric manner with respect to a longitudinal axis and with respect to a transverse axis passing through the communication antenna at its center.

The invention relates to any detection and near-field communication device integrated into a vehicle door handle.

The invention also relates to any automotive vehicle comprising a detection and near-field communication device such as described hereinabove.

BRIEF DESCRIPTION OF THE DRAWINGS

Other objects, characteristics and advantages of the invention will become apparent on reading the description which follows and on examining the appended drawings in which:

FIG. 3 represents a schematic side view of a detection and near-field communication device, with and without the resonators of the invention, FIG. 4 represents a schematic view of a resonator of the detection and near-field communication device, according to the invention.

DETAILED DESCRIPTION OF THE INVENTION

Figure 1:
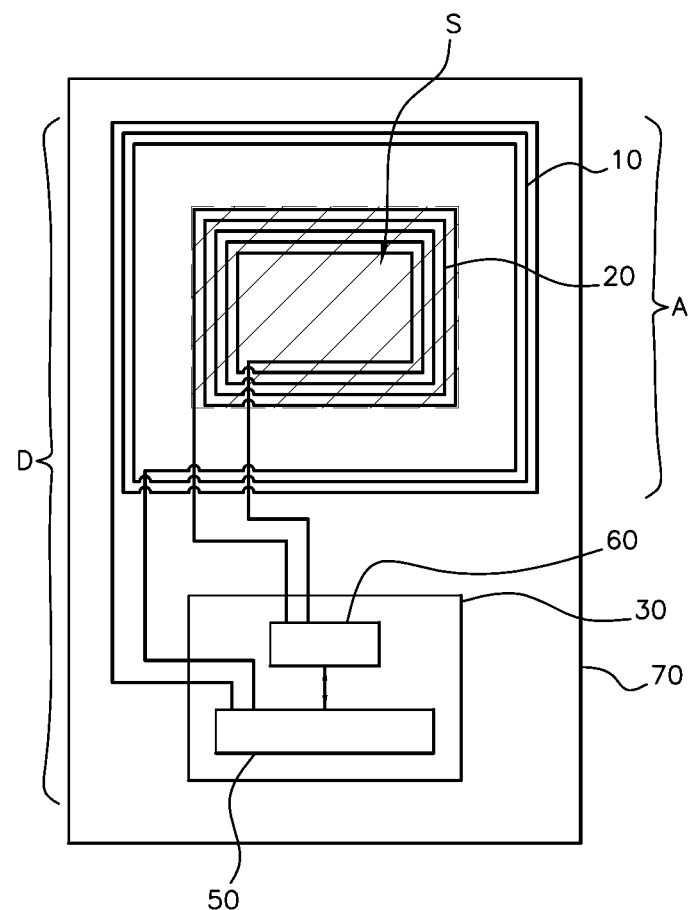
FIG. 1 represents a schematic view from above of a detection and near-field communication device, according to the prior art.

According to the prior art (cf. FIG. 1), a detection and near-field communication device D comprises a primary NFC antenna A and a microcontroller 30, integrating a near-field communication reader, called the NFC reader 60, and a detection module 50. The primary NFC antenna A comprises:
a communication antenna 20, consisting of copper wire windings on a surface S,
a detection antenna 10, consisting of copper wire windings around the communication antenna 20.

Each of these antennas is linked to the microcontroller 30. The communication antenna 20 is linked to the NFC reader 60 of the microcontroller 30, and the detection antenna 10 is linked to the detection module 50 of the microcontroller 30. The microcontroller 30 (cf. FIG. 3) is integrated into a printed circuit 70, an upper face $F_S$ of which is situated under the primary NFC antenna A. The detection and near-field communication device D is situated in a restricted space, for example in a vehicle door handle P. The upper face $F_S$ of the printed circuit 70 and the communication antenna 70 are situated on the side of the door handle P which is oriented toward the exterior of the vehicle.

With reference to FIG. 1, according to the prior art, when a portable device (not represented), carried by a user, approaches the detection antenna 10, the voltage across the terminals of the latter varies (decrease or increase). This voltage variation is detected by the detection module 50 of the microcontroller 30, which then activates the communication antenna 20. The activation of the communication antenna 20 creates an electromagnetic field B1 (cf. FIG. 3) around this communication antenna 20, which corresponds to a zone of near-field communication with the portable device. This near-field communication zone is characterized by a maximum distance $d_{MAX1}$ of communication (cf. FIG. 3) between the communication antenna 20 and a secondary NFC antenna (not represented) integrated into the portable device. If the portable device is situated, in relation to the communication antenna 20, at a distance of less than this maximum communication distance $d_{MAX1}$, then a near-field communication can take place between the two antennas (communication antennas and secondary NFC antenna), in this instance an exchange of identifier is carried out between the two antennas, thereby making it possible to identify the portable device and to trigger the unlocking of the doors of the vehicle (if the portable device is recognized as authorized to access the vehicle).

If the portable device is at a distance of greater than the maximum communication distance $d_{MAX1}$, then no communication is possible between the communication antenna 20 and the secondary NFC antenna of the portable device and the unlocking of the doors of the vehicle cannot be carried out.

This detection and near-field communication device D is known to the person skilled in the art and will not be detailed further here. As explained previously, the major drawback of such a detection and near-field communication device D lies in the impossibility of increasing the maximum communication distance $d_{MAX1}$ without impacting the size of said device, its electrical consumption or else without adding expensive components.

Figure 2:
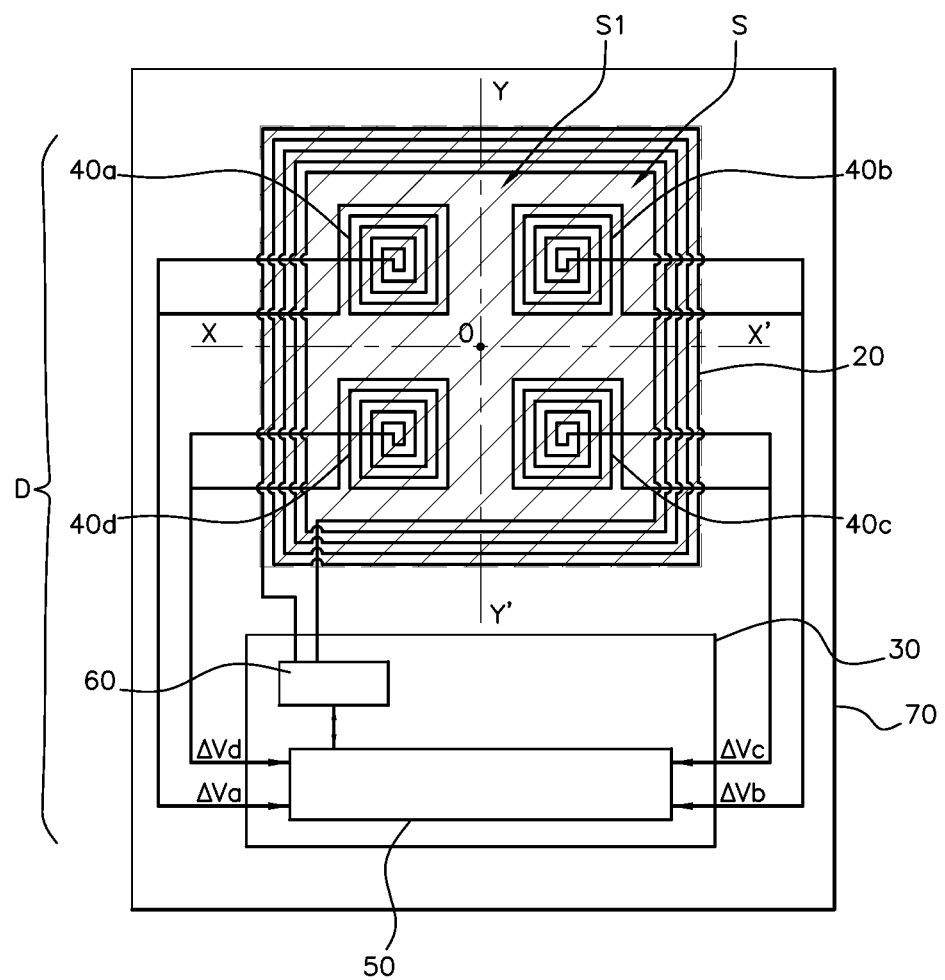
FIG. 2 represents a schematic view from above of a detection and near-field communication device, according to the invention.

As illustrated in FIG. 2, the detection and near-field communication device D, according to the invention, comprises a plurality of resonators 40a, 40b, 40c, 40d. These resonators 40a, 40b, 40c, 40d consist of copper wire windings printed on a face of the printed circuit 70 (not represented in FIG. 1). These resonators 40a, 40b, 40c, 40d are passive, that is to say they are not supplied with current. In a preferential manner, as illustrated in FIG. 3, they are printed on a lower face $F_I$ of the printed circuit 70. This lower face $F_I$ is opposite the upper face $F_S$ of the printed circuit 70, above which the communication antenna 20 is located. In the case where the printed circuit consists of a plurality of layers, it is also possible to integrate the resonators 40a, 40b, 40c, 40d between two successive layers of the printed circuit 70, for example beneath the first layer on which the communication antenna 20 is located.

The plurality of resonators 40a, 40b, 40c, 40d covers a surface S1 substantially identical to the surface S of the communication antenna 20.

These resonators 40a, 40b, 40c, 40d reflect that part of the electromagnetic field B1 created by the communication antenna 20 and which is oriented toward the vehicle. More precisely, the resonators 40a, 40b, 40c, 40d reflect this electromagnetic field part B1 toward the exterior of the vehicle. The new electromagnetic field B2 thus created by the presence of the resonators 40a, 40b, 40c, 40d (cf. FIG. 3) is oriented mainly toward the exterior of the vehicle and is wider than the magnetic field B1 created by the communication antenna 20 without the presence of the resonators 40a, 40b, 40c, 40d. It follows that the new maximum distance $d_{MAX2}$ of the new magnetic field B2 is markedly greater than the maximum distance $d_{MAX1}$ obtained without the resonators 40a, 40b, 40c, 40d. According to the invention, the new maximum distance $d_{MAX2}$ of near-field communication thus obtained is of the order of 30% to 50% larger than the maximum distance $d_{MAX1}$ of communication obtained without the resonators 40a, 40b, 40c, 40d of the invention.

According to a preferential embodiment, the resonators 40a, 40b, 40c, 40d are laid out in a homogeneous manner over the lower face $F_I$ of the printed circuit 70. More precisely (cf. FIG. 2), the distribution of the resonators is symmetric in relation to the longitudinal X-X' and transverse Y-Y' axes passing through the communication antenna 20 at its center 0. Thus, the reflection of the electromagnetic field B1 created by the communication antenna 20 is homogeneous over the surface S of the communication antenna 20. And, the gain in maximum communication distance is distributed in a uniform manner in the directions of propagation of the new magnetic field B2.

It is important to note that it is desirable not to integrate the resonators 40a, 40b, 40c, 40d on the same face of the printed circuit 70 as that where the communication antenna 20 is located, in this instance, in our example, on the upper face F. This immediate proximity between the communication antenna 20 and the resonators 40a, 40b, 40c, 40d disturbs the magnetic field B1 by reducing the near-field detection zone, this being undesirable.

According to a second aspect of the invention, each resonator 40a, 40b, 40c, 40d is linked to the detection module 50 and the primary NFC antenna does not comprise any detection antenna 10. The detection module 50 detects the voltage variation ΔVa, ΔVb, ΔVc, ΔVd across the terminals of each resonator 40a, 40b, 40c, 40d (cf. FIG. 2). These voltage variations ΔVa, ΔVb, ΔVc, ΔVd are representative of the approach of a portable device close to the resonators 40a, 40b, 40c, 40d. Thus, the detection antenna 10 is no longer necessary, it can be discarded, replacing it with the voltage measurement across the terminals of each resonator 40a, 40b, 40c, 40d.

In a first embodiment, each resonator 40a, 40b, 40c, 40d comprises frequency adjustment means, such as an adaptation capacitor Ca, Cb, Cc, Cd (cf. FIG. 4). These adaptation capacitors are calibrated in such a way that each resonator 40a, 40b, 40c, 40d resonates at the near-field communication frequency, that is to say at the frequency of 13.56 MHz.

In a second embodiment, alternatively, the impedance of each resonator 40a, 40b, 40c, 40d, is calibrated in such a way that the resonators resonate at 13.56 MHz. This impedance is calibrated by adjusting for example, for each resonator 40a, 40b, 40c, 40d, the number of its copper wire windings.

Thus, the voltage variations ΔVa, ΔVb, ΔVc, ΔVd measured across the terminals of the resonators 40a, 40b, 40c, 40d, when implementing the first or second embodiment described hereinabove, allow solely the detection of the approach of a communication antenna communicating at 13.56 MHz, that is to say the approach of a portable device integrating a secondary NFC antenna.

Of course, the detection can be carried out by setting a threshold to the voltage variation ΔVa, ΔVb, ΔVc, ΔVd of each resonator 40a, 40b, 40c, 40d. Or else, the detection can be carried out by setting a threshold to the values obtained by the multiplication and/or the addition of the voltage variations ΔVa, ΔVb, ΔVc, ΔVd among themselves, or to any value obtained on the basis of these voltage variations ΔVa, ΔVb, ΔVc, ΔVd thanks to any other mathematical formula, according to the detection accuracy desired.

An advantage of the detection and near-field communication device D according to the invention lies in the fact that the resonators 40a, 40b, 40c, 40d being of smaller size than the communication antenna 20, there is no phenomenon of coupling between said resonators and the communication antenna 20.

Figure 5A:
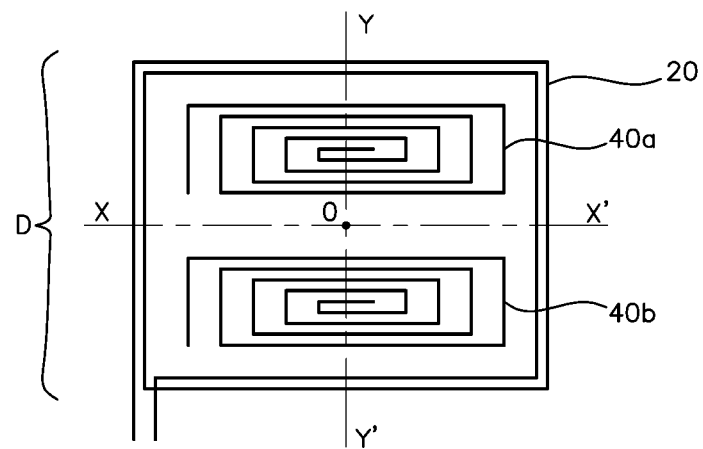
FIGS. 5a, and 5b represent schematic views of a detection and near-field communication device, according to a first and second variant of the invention.
Figure 5B:
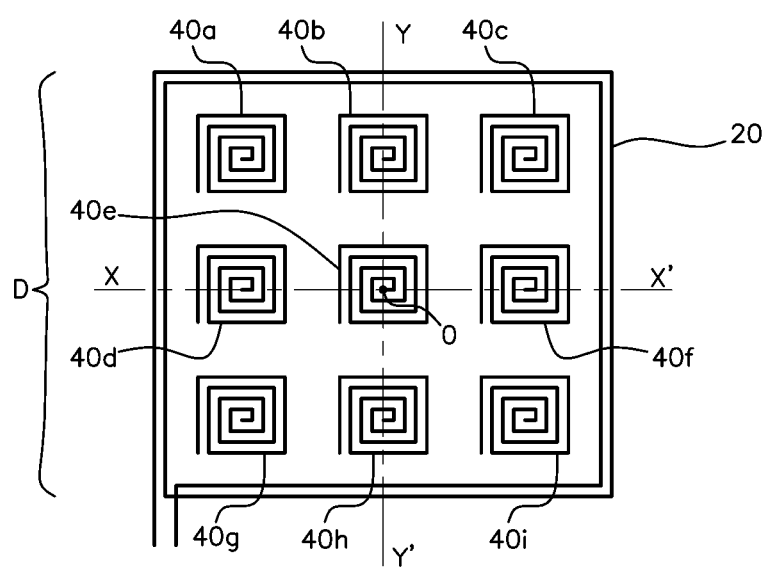

Other variants of the detection and near-field communication device D are possible. In particular, the number of resonators and their disposition can vary. This is illustrated in FIGS. 5a and 5b. In FIG. 5a, the detection and near-field communication device D comprises only two resonators 40a and 40b, disposed in a symmetric manner with respect to the longitudinal X-X' and transverse Y-Y' axes passing through the communication antenna 20 at its center 0. In FIG. 5b, the detection and near-field communication device D comprises nine resonators from 40a to 40i, disposed in a symmetric manner with respect to the longitudinal X-X' and transverse Y-Y' axes.

Likewise, the shape of the resonators can be diverse: square, rectangular, oval, round, etc.

The detection and communication device according to the invention, therefore makes it possible:
- not only to increase the maximum near-field communication distance between the portable device and the primary NFC antenna onboard the vehicle, but also,
- to detect solely the presence of a portable device comprising a near-field communication antenna (which was not possible with the solution of the prior art, since the detection antenna 10, given its size, was not calibrated to 13.56 MHz, to avoid any phenomenon of coupling with the communication antenna 20),
- and consequently to dispense with the presence of the detection antenna.

Of course, the invention is not limited to the embodiment described, given solely by way of nonlimiting example.

The invention claimed is:
1. A detection and near-field communication device (D) for detecting the approach of a portable device integrating a near-field communication antenna for communicating with said portable device, the detection and near-field communication device (D) comprising:
 a printed circuit (70), comprising:
  an upper face ($F_S$), oriented toward the portable device and a lower face ($F_I$) oriented on the opposite side from the upper face ($F_S$),
  a microcontroller (30),
  a near-field reader (60), and
  a detection module (50), a near-field communication antenna (20), situated on a face ($F_S$) of the printed circuit (70) having a surface (S) and a center (0), and being linked to the near-field reader (60), said detection and near-field communication device (D) being characterized in that it furthermore comprises:

a plurality of resonators (40*a*, 40*b*, 40*c*, 40*d*) made of copper wire windings, printed on a face ($F_I$) of the printed circuit, covering a surface (S1) substantially identical to the surface (S) of the communication antenna (20), said resonators (40*a*, 40*b*, 40*c*, 40*d*) comprising frequency adjustment means so as to resonate at the near-field communication frequency, and said resonators (40*a*, 40*b*, 40*b*, 40*c*) generating a voltage variation across their terminals (ΔVa, ΔVb, ΔVc, ΔVd) and being connected to the detection module (50) to detect the approach of the portable device.

2. The detection and near-field communication device (D) as claimed in claim 1, characterized in that the communication antenna (20) is situated on the upper face ($F_S$) of the printed circuit (70) which is oriented toward the portable device and in that the plurality of resonators (40*a*, 40*b*, 40*c*, 40*d*) is situated on the lower face ($F_I$) of the printed circuit (70).

3. The detection and near-field communication device (D) as claimed in claim 1, characterized in that the frequency adjustment means comprise an adaptation capacitor (Ca, Cb, Cc, Cd).

4. The detection and near-field communication device (D) as claimed in claim 1, characterized in that the frequency adjustment means consist of a number of copper wire windings.

5. The detection and near-field communication device (D) as claimed in claim 1, characterized in that the plurality of resonators (40*a*, 40*b*, 40*c*, 40*d*) is distributed in a homogeneous manner over the surface (S) of the communication antenna (20).

6. The detection and near-field communication device (D) as claimed in claim 1, characterized in that the plurality of resonators (40*a*, 40*b*, 40*c*, 40*d*) is distributed in a symmetric manner with respect to a longitudinal axis (X-X') and with respect to a transverse axis (Y-Y') passing through the communication antenna (20) at its center (0).

7. The detection and near-field communication device (D) as claimed in claim 1, characterized in that it is integrated into a vehicle door handle (P).

8. An automotive vehicle comprising a detection and near-field communication device (D) as claimed in claim 1.

9. The detection and near-field communication device (D) as claimed in claim 2, characterized in that the frequency adjustment means comprise an adaptation capacitor (Ca, Cb, Cc, Cd).

10. The detection and near-field communication device (D) as claimed in claim 2, characterized in that the frequency adjustment means consist of a number of copper wire windings.

11. The detection and near-field communication device (D) as claimed in claim 2, characterized in that the plurality of resonators (40*a*, 40*b*, 40*c*, 40*d*) is distributed in a homogeneous manner over the surface (S) of the communication antenna (20).

12. The detection and near-field communication device (D) as claimed in claim 2, characterized in that the plurality of resonators (40*a*, 40*b*, 40*c*, 40*d*) is distributed in a symmetric manner with respect to a longitudinal axis (X-X') and with respect to a transverse axis (Y-Y') passing through the communication antenna (20) at its center (0).

* * * * *